May 23, 1961  S. F. GARDNER  2,985,375
TRAILER CONSTRUCTIONS
Filed Sept. 10, 1959
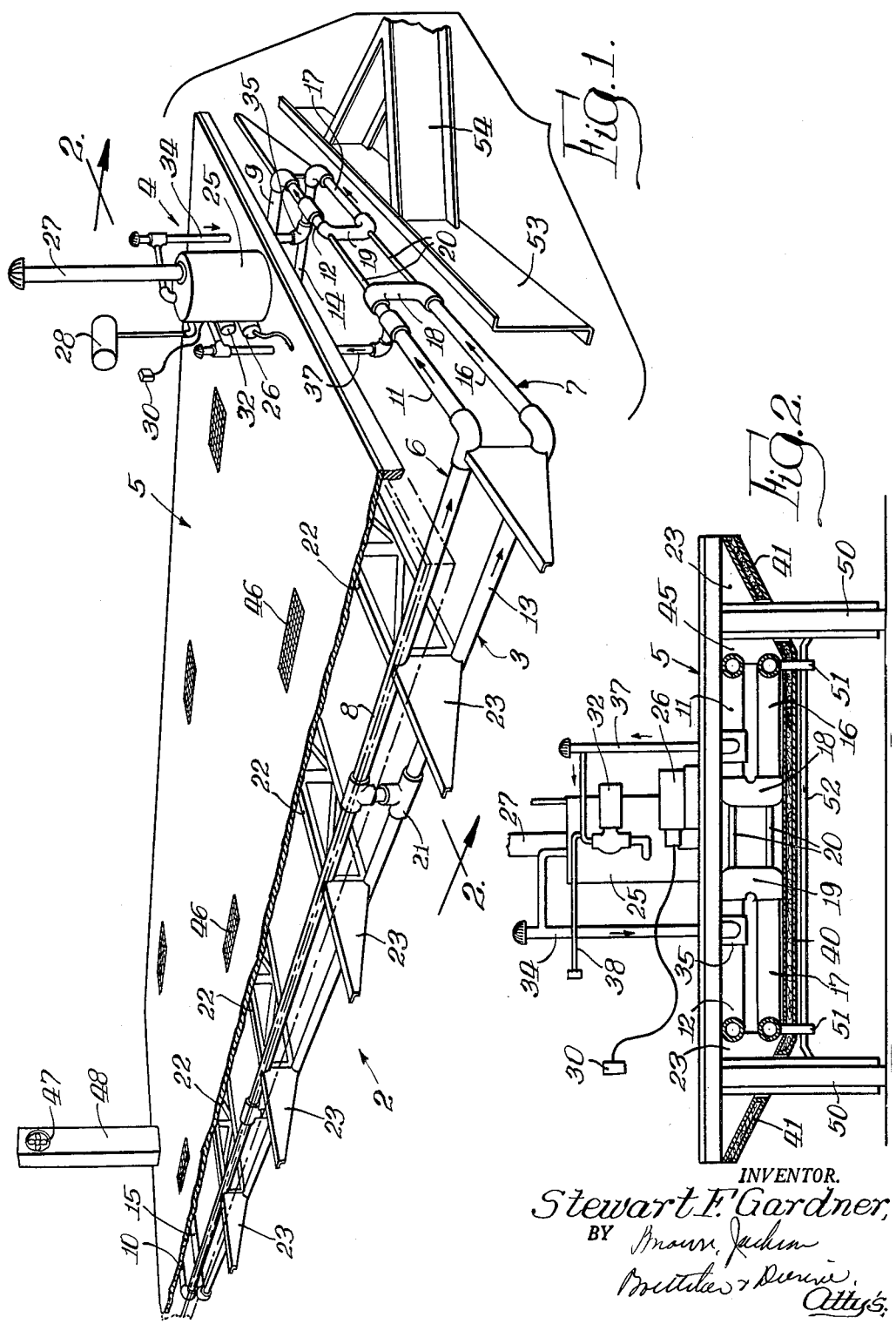
INVENTOR.
Stewart F. Gardner,
BY
Attys.

United States Patent Office 2,985,375
Patented May 23, 1961

2,985,375
TRAILER CONSTRUCTIONS
Stewart F. Gardner, Box 217, Bristol, Ind.
Filed Sept. 10, 1959, Ser. No. 839,221
9 Claims. (Cl. 237—43)

My present invention relates to trailer constructions, and more particularly to an arrangement in which portions of piping or pipe elements utilized in a heating system for the trailer additionally serve as components or frame elements of a main supporting frame for the trailer.

An important objective in the house trailer art is to provide constructions affording maximum usable space with a minimum of structural components to avoid unduly adding to the cost and weight of such structures.

To carry out the aforementioned objective, I have conceived, and it is a primary object of my invention, to utilize rigid piping for conducting the heating medium of a heating system for the trailer to serve, additionally, as structural components for a main supporting frame of the trailer.

In order to achieve the aforementioned object, I propose to use a largely conventional known type of heating system in which rigid metal pipe elements are used to conduct the heating medium, and to embody such rigid pipe elements with other frame members to provide a main frame for supporting the floor and other components of a house trailer.

A further object of my invention is to provide piping for a heating system having rigid pipe elements thereof arranged to lie adjacent and below the outer periphery of the floor or base of a house trailer, and in which transverse frame members are secured between opposed parallel pipe elements of the piping so that such pipe elements and frame members define a main supporting frame for the trailer.

A further object is to provide an arrangement as last noted in which laterally projecting frame members are associated with the piping, preferably as end extensions of the transverse frame members, to provide for the support of a floor or base for the trailer of dimensions greater than the distance between the pipe elements at opposite sides of the trailer.

A further object is to provide a structure of the class above indicated in which piping of the heating system and frame members are enclosed by the flooring and suitable insulating panel members to afford a chamber in which air is heated by the heating medium in the piping for heating the interior of the house trailer.

A further object is to provide an arrangement as above mentioned in which a plate member to provide for attachment of a hitch to tow a house trailer is secured to the piping of the heating system.

The above and other objects and advantages of my invention will appear from the following detailed description of a preferred embodiment of my invention.

Now in order to acquaint those skilled in the art with the manner of building and utilizing trailer constructions of my present invention, I shall describe in connection with the accompanying drawings a preferred embodiment of my invention.

In the drawings:

Figure 1 is a largely diagrammatic perspective view showing the main components of a house trailer construction of my invention in which rigid pipe elements of the piping of a heating system serve as components or frame elements of a main supporting frame for the house trailer; and Figure 2 is a cross-sectional view of a house trailer embodying the components shown in Figure 1 taken along the line 2—2 on Figure 1, and additionally, illustrating insulating panel members providing a chamber below the floor of the trailer in which air is heated.

Referring now to Figure 1, I have shown the novel elements of my invention embodied in a house trailer construction, many components of which are omitted for clarity, such as the walls, roof, doors and windows. The components and parts required to complete the house trailer will be readily recognized, and they will be seen to be well within the skill of an ordinary mechanic and since they form no part of my present invention a showing and description of same is believed to be unnecessary.

It will be seen that the components of my invention for a trailer comprise a main supporting frame 2 defined in part by the piping 3 of a heating system shown at 4 and a floor or base for the trailer indicated at 5.

In the embodiment of my invention shown in the drawings the piping 3 comprises superimposed upper and lower loops of piping 6 and 7, respectively. The upper loop 6 includes a pair of horizontally spaced apart parallel rigid side pipe elements 8 and 9 connected at one end by a rigid pipe element 10, which in a particular arrangement shown is at the rear of the trailer, and short front end rigid pipe elements 11 and 12 extending inwardly toward each other from side pipe elements 8 and 9, respectively. The lower loop 7 also includes a pair of rigid side pipe elements 13 and 14 disposed vertically below the rigid pipe elements 8 and 9 of the upper loop, and the side pipe elements 13 and 14 are likewise connected adjacent the rearward end of the trailer by a rigid end pipe element 15, spaced vertically below pipe element 10 of the upper loop. The lower loop of piping 7 at the forward end of the frame has inwardly extending rigid end pipe elements 16 and 17 extending toward each other and spaced vertically below the inwardly projecting rigid end pipe elements 11 and 12 of the upper loop 6. Pipe connectors 18 and 19 connect the inner ends of upper and lower rigid end pipe sections 11 and 16, and upper and lower rigid pipe elements 12 and 7, respectively, to provide as will appear below, for circulating a heating medium through loops 6 and 7. A pair of tie rods 20 extend between and connect the end connectors 18 and 19 to prevent the upper and lower loops from spreading at the front end of the frame. Suitable spacing means 21 may be employed at intervals along the length of the side pipe elements at each side to hold the upper and lower elements substantially fixed in vertically spaced position.

In such association and relation of upper and lower loops of piping 6 and 7, I provide a plurality of transversely extending truss members comprising rigid reinforced metal frame members 22 disposed in spaced relation with respect to each other lengthwise of and transversely between the upper and lower rigid pipe elements 8 and 13 at one side of the trailer and the upper and lower pipe members 9 and 14 at the other side of the trailer. The opposite end portions of each of the transversely extending rigid frame members 22 may be secured in any suitable manner to the adjacent rigid piping elements as by welding, brazing or in any other suitable manner.

The truss members of the main supporting frame 3 further preferably comprise a plurality of second rigid frame members 23 in the form of metal gussets aligned with and projecting laterally outwardly of the upper and lower rigid pipe elements 8 and 13 on the one hand, and pipe elements 9 and 14 on the other hand. These second frame members 23 are rigidly secured to the aforementioned pipe elements and provide a lateral extension or support for supporting a floor such as shown at 5 of a width in excess of the distance between the rigid pipe elements 8 and 9 of the upper loop, and the rigid pipe elements 13 and 14 of the lower loop. It will be observed that the main supporting frame of my invention thus comprises the aforementioned loops of piping having rigid metal portions, together with the association of truss members constituted by the frame members 22 and 23 therewith in the manner described. Preferably, the upper portions of the rigid pipe members of the upper loop and the upper edges of the truss members defined by frame members 22 and 23 lie in a common horizontal plane to provide for the support of the aforementioned floor member 5 in such horizontal plane. The floor 5 may be secured in any conventional manner to the main supporting frame.

The heating system 4 is conventional and may, for example, comprise a hot water heating plant, having a boiler 25 supported on floor 5 of the trailer, fired by an oil burner 26, the oil supply tank for which is not shown, but which is preferably located externally of the trailer and connected by a pipe to the burner. A flue or chimney 27 extends from the boiler and through the roof (not shown) of the trailer. A conventional expansion tank 28 for hot water system has connection with the boiler and a thermostat 30 which may be located in any suitable position within the trailer controls actuation of burner 26. The heating system preferably is a pressure hot water system and a pump 32 may be provided to effect circulation of the heated hot water in the piping system. Hot water feed piping 34 extends from the top of the boiler to connector 35 mounted in the pipe element 12 to provide for admission of heated water thereto and to upper loop 6, and through connector 19 to pipe element 17 of lower loop 7 for circulation in the direction indicated by the arrows. Water from loops 6 and 7 returns to the boiler through return piping 37 having connection with pipe extension 11, and through connector 18 at the inner ends of extensions 11 and 16. It will be seen that return pipe 37 connects with the inlet of pump 32 so that the pump induces the flow of hot water through the piping system as above described. External water for the system may be introduced into the boiler through pipe 38. Any suitable water circulating system may be employed but for purposes of my invention it should comprise rigid piping suitable for use as components of a main supporting frame for a trailer as above described.

Referring now to Figure 2 of the drawings, it will be seen that the main frame means 3 below the floor 5 is enclosed by insulating panel means including a base panel section 40 lying across the bottom edges of frame members 22 and side panel sections 41 extending from the base section along the bottom edges of frame members 23, and end panel sections for closing of the front and rear ends of the frame. The several insulating panel sections are preferably provided with a foil paper layer facing inwardly intermediate glass insulation or other suitable insulating material, and an outer metal skin. Insulating material of this type is well known in the art and obviously many other suitable forms of insulating members may be used if desired. The several frame components 22 and 23 provide for the attachment thereto of the aforementioned panel sections and such sections, together with the rigid frame members 22 and 23 and floor 5 define a chamber 45 in which the air is heated by the fluid medium flowing through the piping system 3. To admit the heated air from chamber 45 formed by the parts last mentioned, the floor 5 is preferably provided with a plurality of openings or louvered vents 46 communicating with the chamber 45 so that heated air may be admitted therethrough to the interior of the trailer. In order to induce circulation of heated air, I further propose to provide an air intake fan, such as indicated at 47, for drawing air adjacent the ceiling of the trailer and returning the same through duct 48 to the chamber 45.

In Figure 2 I have shown the frame above described mounted on a pair of wheels 50 mounted on the ends of axle 52 secured as at 51 to the lower pipe elements 13 and 14 of the lower loop 7 for transporting the vehicle. In this instance, the side insulating panel sections 41 have openings therein for receiving the wheels 50. However, after the trailer has been moved to the location desired, the wheels are removed and the openings for the wheels may, of course, be appropriately closed to prevent undesirable admission of outside air to chamber 45.

I further propose to provide a steel or other metal plate 53 which may be secured as by welding to the piping at the front end of the frame such as to pipe elements 11, 12, 16 and 17 and to which a hitch 54 may be secured for pulling the trailer.

While I have shown and described what I consider to be a preferred embodiment of my invention it will be understood that various modifications and rearrangements may be made therein without departing from the spirit and scope of my invention.

I claim:

1. In a house trailer construction including a heating system employing a conducted circulating medium, a main supporting frame comprising a pair of substantially parallel horizontally spaced longitudinal frame members each defined by a pair of vertically spaced pipe elements forming a loop portion of said system for conducting said heating medium, and a plurality of truss members extending transversely of said frame members in longitudinally spaced vertical planes each including a central portion extending between the frame members and end portions extending laterally outwardly from the frame members, said truss members being secured to the upper and lower pipe elements of both frame members and maintaining the pipe elements of each pair rigidly in said vertically spaced relation to render each longitudinal frame member effective as a substantially rigid beam of sufficient structural strength to constitute the sole longitudinal frame means adjacent one side of the construction.

2. A construction substantially as set forth in claim 1, in which said truss members are disposed with the upper portions thereof extending in substantially the same horizontal plane as the upper pipe elements to define therewith a floor support plane.

3. A construction substantially as set forth in claim 1, in which means additional to said truss members are provided further rigidly connecting the pipe elements of each pair.

4. A construction substantially as set forth in claim 1, in which said truss member end portions are of triangular shape with upper portions thereof extending in the horizontal plane of the upper portion of the associated truss member central portion.

5. A construction substantially as set forth in claim 1, in which there is provided a floor supported substantially directly on said main frame, insulating panel means supported below said floor by said truss members in enclosing relation to said pipe elements and arranged to define with the floor a chamber providing for the heating of air therein by means of said pipe elements, and means in the floor for discharge of heated air from said chamber to the space above the floor, said discharge means comprising at least one opening through the floor.

6. A construction substantially as defined in claim 5, in which the horizontal extent of said heating chamber corresponds substantially to that of the floor.

7. A construction substantially as defined in claim 5, including air return means communicating with said chamber for drawing air from above the floor and delivering the same to the chamber.

8. A construction substantially as defined in claim 5, including air circulation means communicating with the space above the floor and with said chamber operable to move air from said space into the chamber and from the chamber back through said discharge means into said space.

9. In a house trailer construction, a main supporting frame comprising a pair of substantially parallel horizontally spaced longitudinal frame members each defined by a pair of vertically spaced pipe elements, a plurality of truss members extending transversely of said frame members in longitudinally spaced vertical planes and each including a central portion extending between the frame members and end portions extending laterally outwardly from the frame members, said truss members being secured to the upper and lower pipe elements of both frame members, and means including said truss members maintaining the pipe elements of each pair in said vertically spaced relation to render each longitudinal frame member effective as a substantially rigid beam of sufficient structural strength to constitute the sole longitudinal frame means required adjacent one side of said construction.

References Cited in the file of this patent

UNITED STATES PATENTS

| | | |
|---|---|---|
| 2,107,382 | Maddock | Feb. 8, 1938 |
| 2,152,804 | Hays | Apr. 4, 1939 |
| 2,494,115 | Bock et al. | Jan. 10, 1950 |
| 2,756,000 | Anderson | July 24, 1956 |

FOREIGN PATENTS

| | | |
|---|---|---|
| 569,723 | Canada | Jan. 27, 1959 |